Aug. 23, 1927.
R. C. ZUCKERMAN
1,639,832
SACKING APPARATUS FOR POTATO HARVESTERS
Filed May 3, 1926
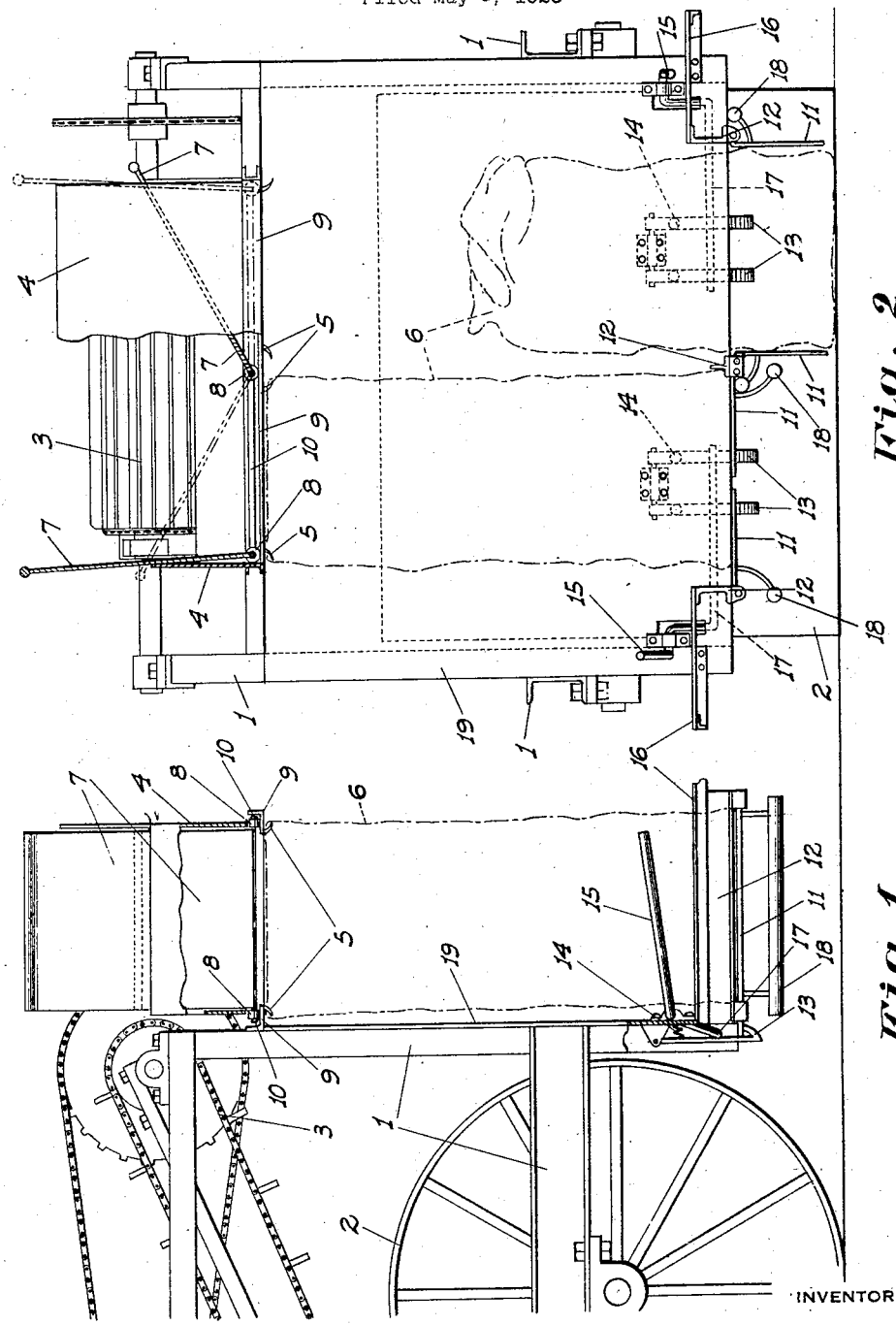
INVENTOR
*R.C.Zuckerman*
BY
ATTORNEY Patented Aug. 23, 1927.

1,639,832

UNITED STATES PATENT OFFICE.

ROSCOE C. ZUCKERMAN, OF STOCKTON, CALIFORNIA.

SACKING APPARATUS FOR POTATO HARVESTERS.

Application filed May 3, 1926. Serial No. 106,581.

This invention relates to improvements in agricultural implements and particularly to improvements in machinery for harvesting potatoes and similar produce.

At present potato diggers or harvesters are so constructed that the potatoes as dug from the ground are raised a certain distance and deposited on the surface of the ground in the wake of the machine. This necessitates the use of other means, usually field hands, to follow up the harvester and gather up the potatoes. This operation of course consumes considerable time and entails considerable expense.

The principal object of my invention therefore is to provide an apparatus carried on the harvester for enabling the potatoes to be sacked while the harvester is in motion, the sacks into which the potatoes are automatically fed being maintained in their natural vertical position during the filling operation.

A further object is to provide means for enabling a pair of transversely spaced sacks to be alternately filled from a common conveyor, so that while one sack is being filled another empty sack may be mounted in position relative to the conveyor so as to be ready to receive potatoes as soon as the first named sack is full. This enables sacking operations to be carried on continually without halting the progress of the harvester to make sack changes.

Still another object is to provide sack supporting means capable of being released by the operator at will to enable a sack to drop to the ground when full, without any manual lifting of the sack off the supports being necessary, and without much danger of the sack toppling over when it engages the ground.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a side elevation of my sacking apparatus, partly broken out, shown in connection with the adjacent portion of a harvester.

Fig. 2 is a rear end elevation of the sacking apparatus also partly broken out.

Referring now more particularly to the characters of reference on the drawings, the harvester on which the sacking apparatus is mounted includes a rigid frame 1 supported adjacent its rear end by a single wide faced wheel 2. At the forward end of the frame is a digging mechanism of suitable character, (not shown) which delivers to an endless upwardly sloping conveyor 3 of common form. This conveyor terminates at the rear upper end of the frame 1 a sufficient distance from the ground to accommodate a sack thereunder in a vertical position with considerable clearance to spare.

Projecting rearwardly from the main frame 1 and connected thereto is a rectangular hopper structure 4, open on the bottom and extending the full width of the conveyor in proper alinement with respect thereto to receive all produce passing over the upper end of said conveyor. Sack engaging hooks 5 of common character are mounted directly under the hopper, said hooks being arranged in the form of sets to hold open and support the mouths of two transversely spaced sacks.

To cause the potatoes delivered into the hopper from the full width of the conveyor to be discharged into one or the other of a pair of sacks 6 depending from the hooks 5, I provide a pair of longitudinally extending and transversely spaced deflector or hopper plates 7. These plates carry rollers 8 or the like at their lower ends which ride on tracks 9 disposed along the bottom of the hopper at the front and back thereof. The lower ends of the plates at front and back are flexibly connected by rigid links 10. The length of these links is substantially equal to half the width of the conveyor, while the height of the plates 7 is such that when the lower end of either plate is adjacent the center of width of the hopper, said plate will extend at an upward slope toward the adjacent side of the hopper and will overhang the top of the same. The other plate will then be disposed in a substantially vertical position adjacent the opposite side of the hopper and will rest thereagainst.

When the plates are thus disposed the potatoes from the entire width of the conveyor will be discharged only into the sack hung beneath the opening between the lower ends of the plates, the sloping plate acting as a slanting hopper-side.

If the plates are then acted on to cause their position to be reversed, the potatoes from the conveyor will only be delivered to the other sack, as will be evident. This change in position of the plates is had without removing the same from the fixed hopper 4, by merely pushing on one plate or pulling on the other, the rollers riding freely along the tracks. The plates being interconnected at their lower ends the space between such ends, regardless of the relative angle of setting of said plates, will always be constant.

Each sack and the load therein is supported on a pair of longitudinally extending doors or platforms 11 which are hinged along their opposite edges onto extensions 12 projecting rearwardly from the frame 1. The doors are normally held in horizontal alinement by relatively fixed catches 13 which are maintained in their door engaging positions by springs 14.

To retract the catches from the doors so as to allow the same to drop by the weight of the sack and its contents bearing thereon, I provide a foot lever 15 pivoted at one end on the rear of the frame 1 and extending thence rearwardly above the operator's platform 16, which is mounted at the outside of the doors and sack.

This lever is connected to a horizontal and transversely extending trip arm 17 which bears against the rear faces of the catches in such a manner that when the lever is depressed the catches are moved forwardly and disengaged from the doors. The latter then drop owing to the weight resting thereon and the sack drops to the ground. Since there are no transversely extending elements on the machine rearwardly of the doors, the forward movement of the harvester permits the sack to remain in an upright position on the ground. As soon as the doors clear the sack, the doors are restored to their normal catch engaging positions by the action of suitable counterweights 18 applied to the doors.

To keep dirt and dust from being thrown from the wheel 2 against the sacks and interfering with sacking operations, I preferably mount a transverse vertical plate 19 rearwardly of the wheel and ahead of the sacks and operators' platforms.

It is of course to be understood that the two sets of doors both have independent catch means and releasing means therefor, and that the platforms 16 are on both sides of the machine, so that an operator on one side controls and manipulates the adjacent sack, while an operator on the other side controls the other sack. Shifting of the plates 7 may be done by either operator.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In combination with a harvester having a conveyor on which the produce as harvested is carried; a fixed hopper at the rear end of the conveyor into which the latter discharges over its total width, means under the hopper for supporting a pair of sacks in transversely alined relation, a pair of movable and transversely spaced plates extending longitudinally in the hopper, means connecting the plates at their lower ends to maintain such ends in constant and predetermined spaced relation, the plates at their upper ends being unconnected and resting against the sides of the hopper, and means supporting the plates at their lower ends and enabling such ends to be shifted transversely of the hopper.

2. In combination with a harvester having a conveyor on which the produce as harvested is carried; a fixed hopper at the rear end of the conveyor into which the latter discharges over its total width, means under the hopper for supporting a pair of sacks in transversely alined relation, a pair of movable and transversely spaced plates extending longitudinally in the hopper, means connecting the plates at their lower ends to maintain such ends in constant and predetermined spaced relation, the plates at their upper ends being unconnected and resting against the sides of the hopper, rollers mounted at the lower ends of the plates in longitudinally spaced relation, and transverse track means on which said rollers ride.

3. In combination with a harvester having a conveyor on which the produce as harvested is carried; a fixed hopper at the rear end of the conveyor into which the latter discharges over its total width, means under the hopper for supporting a pair of sacks in transversely alined relation, a pair of movable and transversely spaced plates extending logitudinally in the hopper, links flexibly connecting the lower ends of the plates and maintaining them spaced approximately the width of a sack, the plates resting against the sides of the hopper, and means supporting the plates at their lower ends in a manner to permit of the transverse movement of said lower ends across the hopper.

4. In combination with a harvester having a conveyor on which the produce as harvested is carried, a hopper into which the conveyor discharges, and platform means mounted in connection with the harvester disposed under the hopper and arranged to support a sack in vertical alinement with the hopper, said platform being displaceable downwardly to allow a filled sack to drop to the ground in an upright position.

5. In combination with a harvester having a conveyor on which the produce as harvested is carried; a hopper into which the conveyor discharges, downwardly opening and longitudinally extending doors under the hopper to support a sack in vertical alinement with the hopper, and means releasable at will normally holding said doors immovable.

6. In combination with a harvester having a conveyor on which the produce as harvested is carried; a hopper into which the conveyor discharges, downwardly opening and longitudinally extending doors under the hopper to support a sack in vertical alinement with the hopper, catches normally engaging the doors and preventing their downward movement, a manually operable lever, and a trip arm associated with the lever arranged to engage and release the catches from the doors when the lever is manipulated.

7. In a potato harvester having a conveyor onto which the potatoes as harvested are carried; a fixed hopper at the rear end of the conveyor into which the latter discharges, such hopper having a discharge opening, a plate extending longitudinally in the hopper and arranged to be partially supported by one side wall of the hopper, and means for moving the lower end of the plate transversely across the discharge opening.

8. In a potato harvester having a conveyor onto which the potatoes as harvested are carried; a fixed hopper at the rear end of the conveyor into which the latter discharges, such hopper having a discharge opening, a plate extending longitudinally in the hopper and arranged to rest against one side wall of the hopper, means for moving the lower end of the plate transversely across the adjacent portion of the discharge opening to close the same, means for closing the opposite portion of the opening, and means connected to said plate and first named means to cause the latter to uncover the corresponding portion of the hopper, as and when the plate is moved to cover its portion of the hopper.

9. In a potato harvester having a conveyor onto which the potatoes as harvested are carried; a fixed hopper at the rear end of the conveyor into which the latter discharges, such hopper having a discharge opening, a plate extending longitudinally in the hopper and arranged to rest against one side wall of the hopper, another similar plate disposed longitudinally in the hopper toward the opposite side thereof, and means connecting the plates in a manner to enable the lower end of one plate to be drawn transversely across the adjacent portion of the opening, while the lower end of the other plate is moved toward the opposite side of the hopper, and vice versa.

10. In a potato harvester having a conveyor onto which the potatoes as harvested are carried; a fixed hopper at the rear end of the conveyor into which the latter discharges such hopper having a discharge opening, a plate extending longitudinally in the hopper, and means supporting the lower end of the plate in transverse slidable relation to the hopper; the plate above said lower end being arranged to constantly rest against one side wall of the hopper whereby when the lower end of the plate is moved transversely across the opening the plate will be disposed at a horizontal angle and will divert produce falling thereon into the hopper-opening beyond the portion thereof covered by the plate.

In testimony whereof I affix my signature.

ROSCOE C. ZUCKERMAN.